United States Patent
Stephens et al.

(10) Patent No.: US 9,504,233 B2
(45) Date of Patent: Nov. 29, 2016

(54) ELECTROMECHANICAL HORN FOR DETERRING ANIMALS

(76) Inventors: Leah Stephens, Conroe, TX (US);
John Stephens, Conroe, TX (US)

( * ) Notice: Subject to any disclaimer, the term of this patent is extended or adjusted under 35 U.S.C. 154(b) by 424 days.

(21) Appl. No.: 13/548,185

(22) Filed: Jul. 12, 2012

(65) Prior Publication Data

US 2012/0272923 A1 Nov. 1, 2012

Related U.S. Application Data (63) Continuation-in-part of application No. 12/719,513, filed on Mar. 8, 2010, now abandoned.

(60) Provisional application No. 61/157,966, filed on Mar. 6, 2009.

(51) Int. Cl.
*A01K 15/02* (2006.01)
*A01M 29/18* (2011.01)

(52) U.S. Cl.
CPC ............ *A01K 15/021* (2013.01); *A01M 29/18* (2013.01)

(58) Field of Classification Search
CPC .... A01M 29/00; A01M 29/16; A01M 29/18; A01M 29/20; G10K 9/00; G10K 9/12; G10K 9/122; A01K 15/02; A01K 15/021; A01K 15/023; A01K 27/009
USPC ................... 119/719, 712, 908; 116/142 FP; 367/139
See application file for complete search history.

(56) References Cited

U.S. PATENT DOCUMENTS

| | | | |
|---|---|---|---|
| 3,058,103 A | 10/1962 | Evans | |
| 3,683,113 A | 8/1972 | Stewart | |
| 4,689,776 A * | 8/1987 | Thorndyke et al. | 367/139 |
| 4,769,794 A | 9/1988 | Beuter et al. | |
| 4,903,929 A | 2/1990 | Hoffman | |
| 5,061,918 A | 10/1991 | Hunter | |
| 5,196,829 A * | 3/1993 | Janis | 340/574 |
| 5,278,537 A | 1/1994 | Carlo et al. | |
| 5,351,653 A * | 10/1994 | Marischen et al. | 119/719 |
| 5,602,523 A | 2/1997 | Turchioe et al. | |
| 6,406,049 B1 | 6/2002 | Jimison et al. | |
| 6,677,853 B1 | 1/2004 | Canfield | |
| 6,750,758 B2 | 6/2004 | Duncan et al. | |
| 7,042,340 B2 | 5/2006 | Ewert et al. | |
| 7,098,775 B2 | 8/2006 | Perlo et al. | |
| 7,841,291 B1 | 11/2010 | Milanovich | |
| 8,737,169 B1 * | 5/2014 | DeWitt et al. | 367/139 |
| 2005/0040935 A1 | 2/2005 | Ewert et al. | |
| 2007/0272144 A1 | 11/2007 | Tomassetti et al. | |
| 2008/0084282 A1 | 4/2008 | Solow | |
| 2008/0258883 A1 | 10/2008 | Solow | |
| 2011/0017149 A1 | 1/2011 | Mushenski et al. | |

FOREIGN PATENT DOCUMENTS

WO WO 2011038418 A2 * 3/2011

* cited by examiner

*Primary Examiner* — Joshua Huson
(74) *Attorney, Agent, or Firm* — Kenneth A. Roddy (57) ABSTRACT

An electromechanical horn having a sound generating system including a piezoelectric speaker generates a series of short, audible sound signals in a repetitive pattern, the generated sound signals having fundamental frequencies with associated harmonic component frequencies and decibel levels that fall within a frequency range of greatest hearing sensitivity of the animal to disperse or deter an aggressive animal in a non-detrimental manner. The generated sound signals have fundamental frequencies with associated harmonic component frequencies that fall within a frequency range of from about 3 kHz to about 10 kHz, and decibel levels in a range of from about 75 dB to about 115 dB (SPL) at 1 meter. The horn device can be hand-held, attached to a user's belt or clothing, or removably attached to a bicycle, motorcycle, stroller, or other conveyance or object and can be actuated while attached or quickly removed and actuated when needed.

3 Claims, 4 Drawing Sheets

ELECTROMECHANICAL HORN FOR DETERRING ANIMALS

CROSS REFERENCE TO RELATED APPLICATION

This application is a Continuation-In-Part of and claims priority of pending U.S. patent application Ser. No. 12/719,513, filed Mar. 8, 2010, which claims priority of U.S. Provisional Patent Application Ser. No. 61/157,966 filed on Mar. 6, 2009, the pendency of which was extended until Mar. 8, 2010 under 35 U.S.C. 119(e)(3).

BACKGROUND OF THE INVENTION

1. Field of the Invention

This invention relates generally to sound devices that are used to disperse or deter animals and, more particularly, to an electromechanical horn device that produces a very loud audible sound in a frequency range in the region of greatest hearing sensitivity of a particular animal species, such as canines, and at a decibel level and pattern specially calculated to effectively disperse or deter an aggressive animal in a non-detrimental manner.

2. Background Art

In the following discussion, for purposes of understanding, the following terms related to sound are given the ordinary and customary meanings attributed to them by those of ordinary skill in the art. "Frequency" refers to the "pitch" of a sound measured in Hertz (Hz) or Kilohertz (kHz). A Hertz is a unit of frequency equal to one cycle per second. Higher frequency=higher pitched sound. "Hearing range" describes the range of frequencies that can be heard by an animal or human, though it can also refer to the range of levels.

Another important aspect of sound is the loudness or intensity of the sound. "Sound Pressure Level" (SPL) correlates to the "loudness" of sound measured in decibels (dB). A "decibel" (dB) is a unit used to measure the sound energy relative to a reference level. An increase of ten decibels in the power of a signal is equivalent to increasing its power by a factor of ten, and the perceived loudness by a factor of two (doubling perceived loudness). Zero decibels is defined as the average human threshold of hearing at 1 kHz. Generally speaking, higher sound pressure correlates with louder sound. The more distant the receiver of the sound is from the sound source, the lower the perceived sound level, thus, sound pressure level (SPL) specifications are typically expressed with regard to the distance (usually in meters) from the sound source and how loud the sound pressure level should be at that distance. Some breeds of dogs respond to a much lower intensity of sound than the average human. Dogs can also hear a broader range of frequencies, some at lower decibel levels than humans.

A pitched sound consists of a number of frequency components arranged in integer multiples of the "fundamental" frequency. These components are called harmonics and are numbered according to the corresponding integer multiple. Thus, the fundamental is the first harmonic. The second harmonic has twice the frequency and the third harmonic three times the frequency of the fundamental, and so on.

The term "audible sound", as used herein, refers to sound which can be perceived by the human ear. In humans the audible frequency range is about 20 Hz to 20,000 Hz (20 kHz), with the frequency range of 3 kHz to 4 kHz (3,000 Hz to 4,000 Hz) being the most sensitive range.

In dogs the "audible" frequency range which can be perceived is about 40 Hz to 60,000 Hz (60 kHz), which is a much greater range than that of humans, with the frequency range of about 4 kHz to 10 kHz (4,000 Hz to 10,000 Hz) being the most sensitive range (i.e. the frequencies that can be detected at the lowest intensities), depending upon the breed and age. Studies by audiology researchers suggest that dogs hear little above 30 kHz (30,000 Hz).

The term "ultrasonic" sound, as used herein, refers to anything above the frequencies of audible sound, and nominally includes anything over 20 kHz (20,000 Hz). Most "silent" dog whistles and bark controllers produce "ultrasonic" sounds at frequencies higher than those audible to humans.

Situations often occur wherein individuals, or groups of individuals, may find themselves confronted by at least one dog. These situations tend to necessitate fleeing from the animal, scaring the animal off, or some other defense tactic. Unfortunately, the individual or individuals may become hurt in attempting to flee or discourage the animal. The animal may charge or attack the individuals and/or chase them causing further stress to the individuals and increasing the chances for injuries to both the individuals and the animals.

There are several commercially available dog deterrent devices such as the DAZER™ and DAZER II™, manufactured by Dazer International, Peterborough, England and distributed by K-II Enterprises of Syracuse, N.Y., emit high frequency "ultrasonic" sound bursts of 25 kHz (25,000 Hz) at a decibel level of 115 dB (SPL) at 0.5 meter reference. The DAZER devices are advertised as having an effective range of about 15 feet and increasing effectiveness as the dog becomes closer to the sound source.

Most "ultrasonic" dog deterrent devices provide high frequency "ultrasonic" sound burst to produce a startle effect to interrupt a dog's barking or the dog's aggressive behaviour, and their deterrent effectiveness depends upon the dog's reaction to the strange sound. However, such devices are not effective on all dogs. For example, the dog's reaction depends upon its age, breed, mental state, temperament, health and intelligence. For instance, smaller dogs react better to "ultrasonic" noise, whereas medium to large sized dogs are more responsive to "audible" blasts of sound.

A typical "ultrasonic" sound burst produced by most ultrasonic dog deterrent devices is in the frequency range starting at about 20 kHz (20,000 Hz), which is above the most sensitive region of a dog's hearing (between 4 kHz and 10 kHz), but is at a decibel level to be detected by some dog breeds at close range and produce the startle effect. Another problem with "ultrasonic" dog deterrent devices is that the ultrasonic frequency does not disperse well and becomes more directional as the frequency increases, thus, their effectiveness can also depend upon how precisely the user aims the sound emitting device.

The more distant a receiver of the sound (the dog) is from the sound source, the lower the perceived sound level (dB). For example, the perceived sound level (dB) of an "ultrasonic" deterrent device which has a decibel level of 115 dB (SPL) at 0.5 meters (approximately equal to 1 foot 7½ inches) would be much less at a distance of about 15 feet. Moreover, the sound pressure level (dB) is only one component of the sound. An "ultrasonic" deterrent device emits "ultrasonic" sound bursts in a frequency of 25 kHz (25,000 Hz) which falls in a region of relatively low sensitivity canine hearing, well above the region of greatest sensitivity.

Air horns or aerosol horns are also often used to deter an aggressive dog. Air horns produce sound bursts in the "audible" frequency range, and operate on a different principle from electromechanical horns. The air horn produces sound by discharging a gas at high velocity from a gas canister through a small orifice near the base of the horn. The gas jet contains broadband energy (i.e., at many acoustical frequencies). A flexible membrane, which traps a small volume of air, acts as a resonator or reed that concentrates the energy at the "natural" frequency of its lowest vibration mode.

As an example, Falcon Safety Products Inc., of Branchburg, N.J., produces a line of air horns having "audible" frequency ranges of from about 70 to 700 Hz, at 112 dB to 120 dB (SPL) at 10 feet.

As discussed above, the more distant a receiver of the sound (the dog) is from the sound source, the lower the perceived sound level (dB). For example, the perceived sound level (dB) of an "audible" air horn device which has a decibel level of 112 dB to 120 dB (SPL) at 10 feet (approximately equal to 3.048 meters) would be greater at a distance of 1 meter. However, the sound pressure level (dB) is only one component of the sound. "Audible" sound blasts emitted by an air horn deterrent device in the frequency range of 70 Hz to 700 Hz also fall into a region of relatively low sensitivity canine hearing, below the region of greatest sensitivity.

Another major problem with many air horns is that the pressure of the gas and thus the sound output is inversely proportional to the temperature of the gas. Thus, on hot days, the pressure of the gas passing through the small orifice would be greater and could even freeze or cause ice to build up at the orifice as the gas expands through the orifice; and on very cold days, the pressure of the gas passing through the small orifice would be significantly reduced and may not produce any sound at all.

There are several patents that disclose electronic sound devices designed to disperse or deter various animals.

Evans, U.S. Pat. No. 3,058,103, discloses a device for chasing pests such as rodents and bugs including flies and mosquitoes. The device generates an ultrasonic alternating signal having a frequency in a range having the lower limit of the range above that discernible by a human being and having the upper limit of the range lying between 20 kHz and 35 kHz. The generated alternating signal is then preferably constantly varied between these limits. The generated signal is then amplified sufficiently to drive a transducer or speaker to produce a sound which is inaudible to the human ear (above 20 kHz). The speaker may also be alternately turned on and off in combination with the varying of the frequency referred to which rodents are incapable of withstanding, and as a result, they leave the area. In the case of bugs, such as flies and mosquitoes, the frequency is preferably varied in a range which extends from the upper range (20 Hz-35 kHz) to an upper range lying in the order of 200 kHz.

Stewart, U.S. Pat. No. 3,683,113, discloses a synthetic animal sound generator and method for ridding an area of pest birds by generating signals that correspond to warning or alarm signals normally created by the birds themselves. The apparatus generates a carrier signal in a frequency range of about 500 Hz to about 5,000 Hz. The carrier signal is modulated by a lower frequency AC signal in the range of about 50 to 300 Hz to form a composite signal which is intermittently silenced to generate a plurality of signal pulses. The modulated carrier signal is intermittently interrupted at a rate of at least about once per second to produce a chirping sound, and an electro-acoustic transducer converts the modulated and intermittently interrupted carrier signal to a sound signal which is directed at the pest birds.

Beuter et al, U.S. Pat. No. 4,769,794, discloses a bird-scaring method and device wherein at least two acoustic signals are generated whose frequencies are periodically modulated within a range between about 30 Hz and 9,000 Hz, the modulation period ranging between about 0.01 and about 5 seconds. The signals differ in the frequency modulation range, in the modulation period and/or in duration, and may be emitted either in fixed or in arbitrary sequence. The interval between the individual signals can be between 20 seconds and 1 hour, preferably between 1 and 30 minutes, in particular between 5 and 20 minutes. Each of the signals are frequency-modulated preferably between 100 Hz and 7,000 Hz, in particular between 150 Hz and 5,000 Hz. The modulation period ranges between about 0.01 and 5 seconds, preferably between 0.02 and 2 seconds, in particular between 0.05 and 1 second. Particularly favorable results are obtained if the range in which frequency modulation occurs covers at least 2,000 Hz. The lower limit of the frequency modulation range should preferably be, however, between 1,000 Hz and 100 Hz, in particular between 500 Hz and 100 Hz. The duration of each individual signal is between 1 and 30 seconds, preferably between 10 and 20 seconds. Due to the measure according to the invention, a sound pressure level of about 60 dB at the place of sound emission is sufficient.

Carlo et al, U.S. Pat. No. 5,278,537, discloses an electronic vehicle mounted alarm for avoiding collision with animals in a non-destructive manner, which generates ultrasonic sound for preventing animals from moving into the path of the vehicle. The device generates electrical impulses in the form of square waves having constant peak-to-peak voltages with periodic, sequentially increasing wave frequencies followed by sequentially decreasing wave frequencies. A coupling transformer converts the square waves into electrical sine wave voltages having high peak-to-peak voltages to cause a piezo-electric transducer to emit intense, ultrasonic sounds of periodically increasing frequencies in a range from 19 kHz to 30 kHz (19,000 Hz to 30,000 Hz) followed by periodically decreasing frequencies simulating the warble effect of a siren. A preferred frequency pattern commences at 21 kHz (21,000 Hz) and continues until 24 kHz (24,000 Hz) immediately followed by a decrease in sequence from 24 kHz to 21 kHz. The ultrasonic warble effect confuses the animal to prevent inadvertent movement by the animal into the oncoming vehicle's path without injury to the animal.

Canfield, U.S. Pat. No. 6,677,853, discloses an animal deterrent system using the vehicle horn to deter auto collisions with animals, and more specifically to allow the standard automobile horn to be altered in a manner such that the noise alerts animals, particularly deer, to the presence of an approaching vehicle. A timer/oscillator is selectively connected between the vehicle horn actuator (e.g., the button on the steering wheel of the vehicle) and the vehicle horn. When the timer is connected between the horn actuator and the horn, a continuous input to the horn actuator is converted to an intermittent horn output (preferably cycling between 2 Hz and 20 Hz), with the intermittent horn output synchronized with the timer pulses.

Ewert et al, U.S. Pat. No. 7,042,340, discloses a vehicle mounted animal alerting device that produces a sound that stimulates an alertness response in large animals, such as a deer, to reduce the likelihood that the animals will run into a roadway and cause an animal-vehicle crash. The sound produced by the device is a random intermittent sound pattern in an audible frequency range (in the same general range that humans can hear). More specifically, an animal alerting device in accord with a preferred Ewert et al embodiment produces sounds generally in the range of 1-10 kHz (1,000 to 10,000 Hz) and, more specifically, in the range of 1-5 kHz (1,000 to 5,000 Hz). The volume of the sound produced is automatically adjusted for vehicle speed. For example, in a vehicle traveling at highway speed the sound is amplified to a relatively high level, e.g., approximately 80 dB or more. Different sound patterns may be produced automatically based on different geographical locations of the vehicle in which the device is mounted.

Perlo et al, U.S. Pat. No. 7,098,775, discloses a system and method for avoiding the collision of a vehicle with animals tending to cross the road before the moving vehicle. The system comprises a visual system directly actuating one or more RF emitters, emitting directional ultrasonic sound waves with a frequency above 25,000 Hz (25 kHz), the range above that discernible by a human being. The sound waves are directed frontally though with a frequency decreasing from the center of the roadway towards the road edge, so as to lead the animal to move towards the road edge.

There are also several patents that disclose electronic sound devices designed to train animals, such as canines. For example, Duncan et al, U.S. Pat. No. 6,750,758, discloses a collar-mounted remotely controlled beeper training device which includes a piezoelectric transducer device mounted in a transducer housing configured as a resonant sound port. The piezoelectric transducer is driven by circuitry including a microcontroller, a voltage booster circuit, and driver circuitry coupled to the booster circuit producing a boosted drive signal to the piezoelectric device. The microcontroller stores data representing a plurality of sequential segments each having a start and stop time and a start and stop frequency representative of an animal sound, such as a hawk scream, and a program executed by the microcontroller sequentially produces a plurality of output signals having a start and stop times and frequencies in response to the stored data so as to accurately reproduce the animal sounds.

There are also several patents that disclose electronic sound devices designed to "attract" animals, rather than disperse or deter them, and other uses.

Solow, U.S. Published Patent Applications 2008/0258883 (abandoned) and 2008/0084282 (now U.S. Pat. No. 8,004,390) disclose a an electro-mechanical horn device having a body, a sound-generating unit mounted in the body, and plural compartments for storing at least one removably mounted battery and a second battery in an operative manner thereby enabling enhanced battery storage and limiting discontinuity of the operation of the sound-generating unit. The sound-generating unit includes an oscillator that provides a series of pulses to an electromagnet speaker having a coil electromagnet and diaphragm. A CPU controller containing pre-recorded digital sounds reproduces previously recorded signals, such as animal sounds, warning signals, etc. The frequency of the sound may be selectively adjusted to generate the sound of a chosen animal. For example, sound signals at a frequency and pitch generally similar to those made by a wild turkey, so as to attract another turkey. The pitch of the horn is determined by the flexibility of the diaphragm; its physical size; the power of the electromagnet; the mass of the diaphragm, and a number of other contributing factors. The pulses have a repetition rate substantially less than the natural frequency (3,000 Hz) of the diaphragm. The horn may be used for sports activity (hunting), sporting events, and emergency rescue operations.

SUMMARY OF THE INVENTION

The present invention overcomes the aforementioned problems and is distinguished over the prior art in general, and these patents in particular by an electromechanical horn device having a generally L-shaped housing with a generally vertical, hand grip portion and an outwardly flared upper portion extending generally perpendicular from the hand grip portion, and a depressible thumb button on the upper portion for receiving the thumb of a user's gripping hand coupled with a push-button activation switch mounted in the housing interior. A piezoelectric speaker, circuit board, microcontroller, and removable battery are mounted in the interior of the housing, and a low-battery indicator light is mounted on the upper portion of the housing. A spring clip is mounted at a lower end of the hand grip portion for releasably attaching the horn device to a user's belt, pocket, or garment. An attachment assembly may also be provided for releasably attaching the horn device to a bicycle, scooter, motorcycle, baby stroller, or other conveyance or object.

When activated, the horn device produces a very loud audible sound in a frequency range in the region of greatest hearing sensitivity of a particular animal species, such as canines, and at a decibel level and sound pattern specially calculated to effectively disperse or deter an aggressive animal in a non-detrimental manner. More particularly, the piezoelectric speaker generates a series of short, audible sound signals in a repetitive pattern, each generated signal having a fundamental frequency with associated harmonics, a decibel level, and duration determined by the microcontroller program. The microcontroller may be programmed to cause the piezoelectric speaker to emit a series of short, "two-tone" audible sound signals of different fundamental frequencies in a repetitive alternating pattern. Alternatively, the microcontroller may be programmed to cause the piezoelectric speaker to emit a series of short, "one-tone" audible sound signals of the same fundamental frequency in a repetitive pattern.

The generated audible sound signals have fundamental frequencies with associated harmonic component frequencies that fall within a frequency range of greatest hearing sensitivity and at decibel levels that can be detected at the lowest intensities at which dogs of a variety of breeds and ages will respond, thereby providing a very effective device to disperse or deter an aggressive canine in a non-detrimental manner.

One of the significant features and advantages of the present invention is that it produces audible sound signals in a frequency range in the region of greatest hearing sensitivity of a particular animal species, such as canines.

Another significant feature and advantage of this invention is that it produces audible sound signals in a frequency range in the region of greatest hearing sensitivity of a particular animal species, and at a decibel level and pattern specially calculated to effectively disperse or deter an aggressive animal, such as a canine, in a non-detrimental manner.

Another significant feature and advantage of this invention is that it produces a series of short, audible sound signals in a repetitive pattern, each generated signal having a fundamental frequency with associated harmonics in a frequency range, and at decibel levels in the region of greatest hearing sensitivity of dogs and at which of a variety of breeds and ages will respond.

Another significant feature and advantage of this invention is that it produces a series of short, two-tone audible sound signals of different fundamental frequencies in a repetitive alternating pattern with associated harmonics in a frequency range, and at decibel levels in the region of greatest hearing sensitivity of dogs and at which of a variety of breeds and ages will respond.

Another significant feature and advantage of this invention is that it produces a series of short, one-tone audible sound signals of the same fundamental frequency in a repetitive pattern with associated harmonics in a frequency range, and at decibel levels in the region of greatest hearing sensitivity of dogs and at which of a variety of breeds and ages will respond.

Another feature and advantage of this invention is that the horn device utilizes a piezoelectric speaker for generating the high intensity of the sound which is small in size, consumes less electric power than conventional magnetic coil and diaphragm speakers, and more reliably reproduces a range of sound frequencies.

Another feature and advantage of this invention is that the horn device may be easily positioned or aimed and actuated to focus the high intensity audible sound toward the aggressive animal such that the brunt of the sound is experienced by the animal.

Another feature and advantage of this invention is that the horn device may be hand-held, easily transported, stored, or attached to a user's belt, pocket, or garment and easily and quickly removed when needed.

A further feature and advantage of this invention is that the horn device is configured so that it may be removably attached to a bicycle, scooter, motorcycle, baby stroller, or other conveyance or object and easily removed or actuated when needed.

A still further feature and advantage of this invention is that the horn device is simple in construction, inexpensive to manufacture, and rugged and reliable in operation.

Other features and advantages of the invention will become apparent from time to time throughout the specification and claims as hereinafter related.

DESCRIPTION OF THE PREFERRED EMBODIMENT

Figure 1:
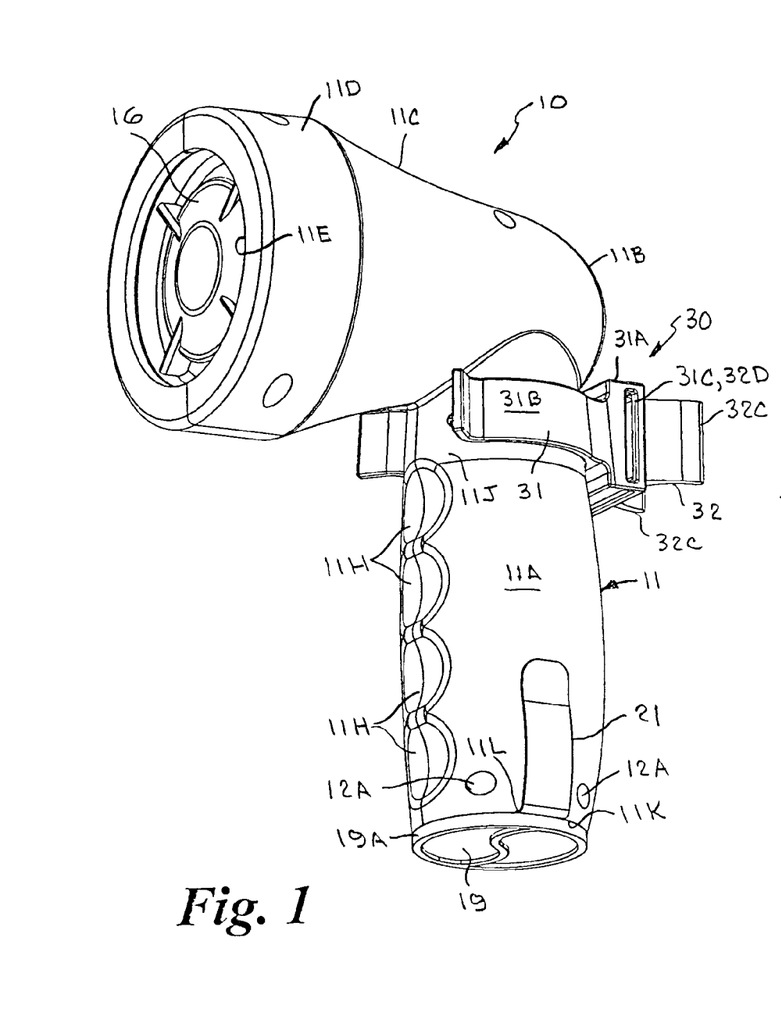
FIG. 1 is a perspective view of the electromechanical horn device in accordance with the present invention, shown from the front, bottom, and one side.
Figure 2:
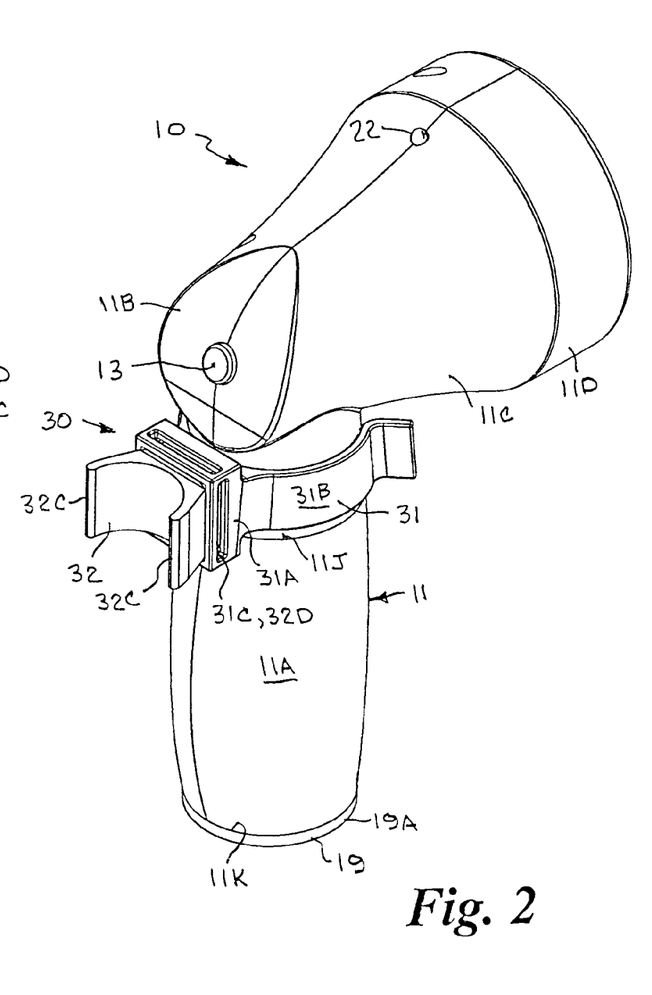
FIG. 2 is a perspective view of the electromechanical horn device shown from the back, top, and side opposite that shown in FIG. 1.
Figure 3:
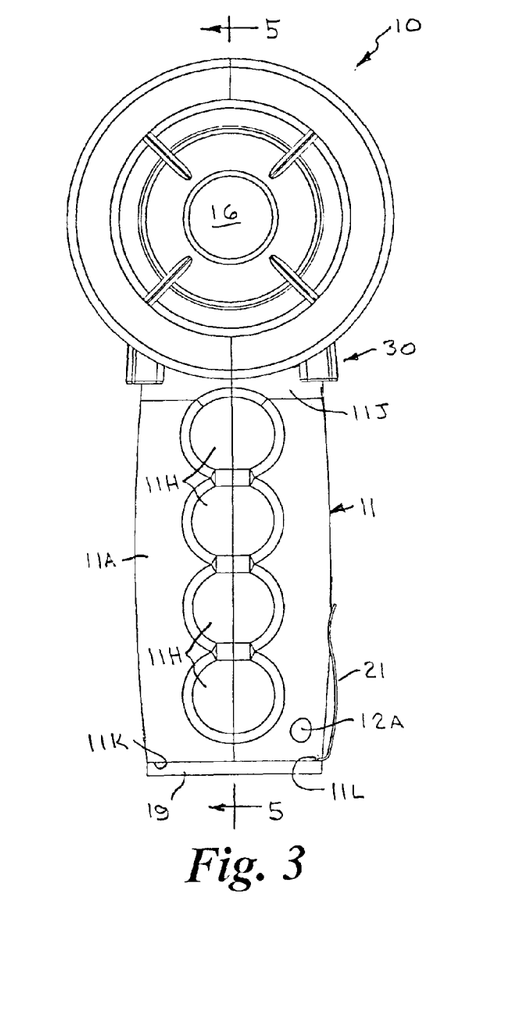
FIG. 3 is a front elevation view of the electromechanical horn device.
Figure 4:
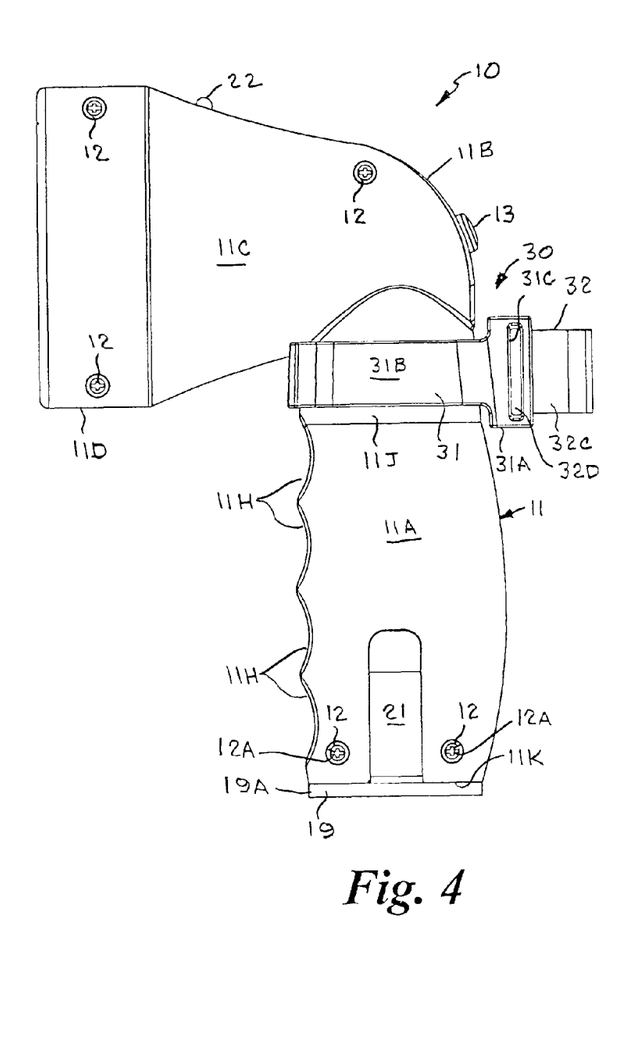
FIG. 4 is a side elevation view of the electromechanical horn device.
Figures 5, 6:
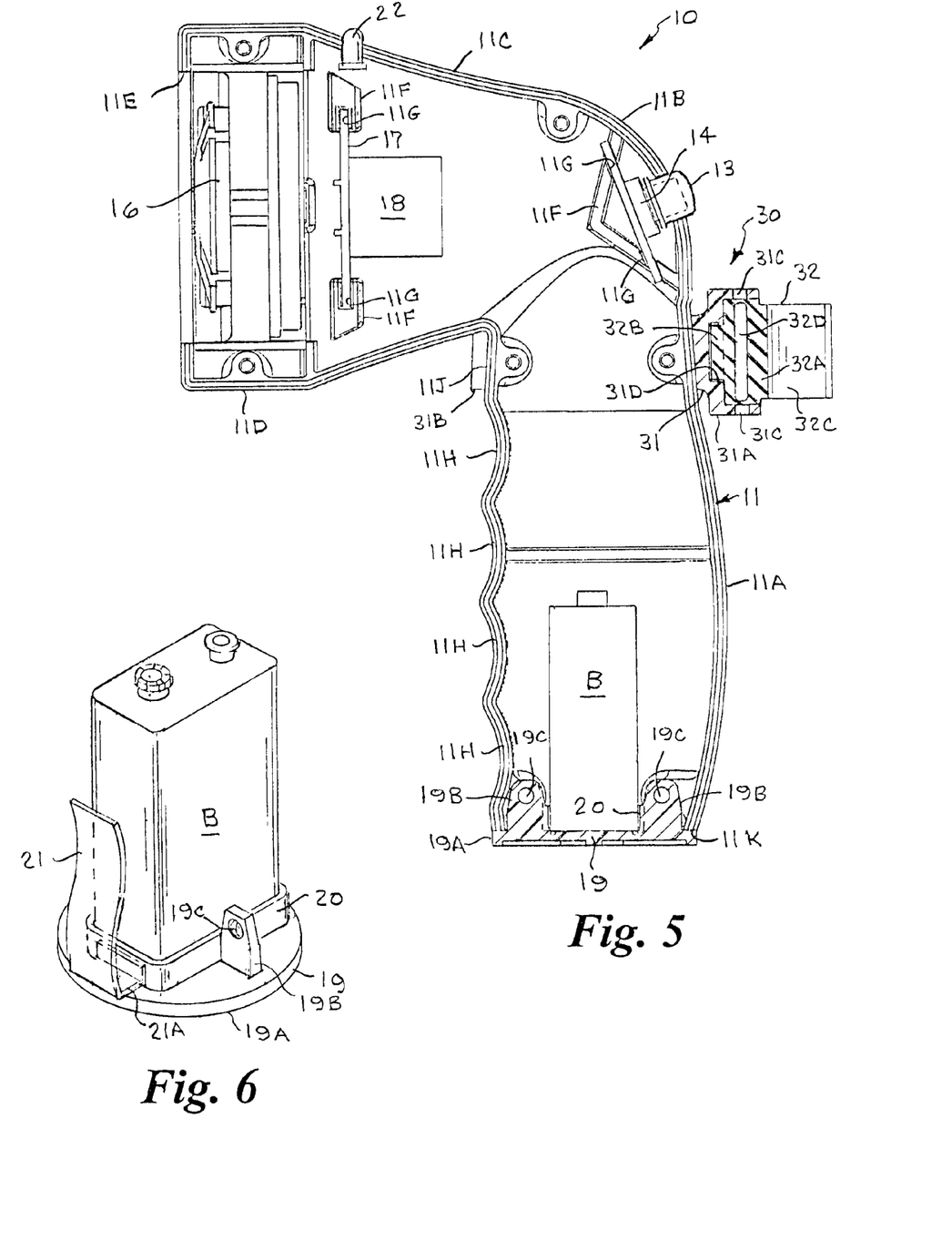
FIG. 5 is a cross sectional view taken along lines 5-5 of FIG. 4, showing the interior of the electromechanical horn device.
FIG. 6 is a perspective view of the end closure, battery holder, and spring clip components of the electromechanical horn device.

Referring to the drawings by numerals of reference, there is shown in FIGS. 1-6, an electromechanical horn device 10 in accordance with a preferred embodiment of the present invention. In the following discussion, the terms, such as top, bottom, upper, lower, inward, outward, downward, above, and below are used to describe the orientation of the horn components as depicted with the device positioned as shown in the drawings The horn 10 includes a generally inverted L-shaped housing 11 formed with a longer, generally vertical, hand grip portion 11A having a curved upper rear end portion 11B and a shorter outwardly flared portion 11C extending generally perpendicular from the hand grip portion and terminating in a generally cylindrical portion 11D having an open distal end 11E. The housing 11 is preferably formed by two halves which are releasably secured together by conventional fastener means, such as screws 12. The interior of each of the halves is provided with walls 11F and retaining slots 11G that define compartments and retaining slots for retaining components in the interior of the housing when the halves are secured together (FIG. 5). The hand grip portion 11A has longitudinally spaced depressions 11H formed along its front surface for receiving the fingers of a user and is of sufficient length to provide a comfortable grip. The housing 11 has a generally cylindrical neck portion 11J disposed between hand grip portion 11A and the outwardly flared portion 11C. A depressible thumb button 13 for receiving the thumb of a user's gripping hand extends through an aperture on the curved upper rear end portion 11B of the housing 11 and is coupled with a push-button activation switch 14 mounted in the housing interior.

A piezoelectric speaker 16 is mounted in the generally cylindrical portion 11D of the housing 11 at the open end 11E thereof. A circuit board 17 containing a microprocessor (microcontroller) 18 is mounted in the interior of the housing 11 inwardly from the piezoelectric speaker 16. The microprocessor (microcontroller) 18 is operatively coupled with the piezoelectric speaker 16. It should be understood that other types of speakers may be used, however, the piezoelectric speaker 16 is preferred because it is small in size, consumes less electric power, and generates sound by the vibration of a thin piezo ceramic plate attached to a diaphragm film and utilizes the piezoelectric vibration of the ceramic plate itself, rather than generating sound with vibration of a diaphragm using the electromagnetic force of a magnet and a coil.

As best seen in FIGS. 5 and 6, the hand grip portion 11A of the housing 11 has an open bottom end 11K that is configured to removably receive an end closure 19 which includes a battery holder frame 20, and a spring clip 21. The end closure 19 has flat circular bottom flange portion 19A, and a generally rectangular battery holder frame portion 20 extending axially upward a distance from the top surface thereof terminating in an open top end. The rectangular battery holder frame portion 20 is configured to receive and frictionally engage the lower end of a battery B, such as a conventional 9-volt DC battery, that is pressed into the open top end thereof. A pair of upstanding flanges 19B are disposed on laterally opposed sides of the battery holder frame portion 20, respectively and each has a threaded hole 19C therethrough. The bottom end 11K of the housing 11 has a short rectangular opening 11L and two screw holes 12A on one side.

The spring clip 21 has a generally U-shaped bottom end 21A mounted on the top surface of the end closure flange 19A adjacent to an outer side of the battery holder frame portion 20. The bottom end 21A of the spring clip 21 extends through the short rectangular opening 11L. The lower portion of the clip arm 21 bows outwardly and upwardly at its lower end and then curves inwardly and terminates in a short outwardly curved portion at its upper end. When the end closure 19 and spring clip 21 are installed, as described below, the clip 21 extends a distance upwardly along one outer lateral side of the hand grip portion 11A with its inwardly curved portion just contacting the side of the hand grip portion. The spring clip 21 mounted on the hand grip portion allows the horn device to be releasably attached to a user's belt, pocket, or garment.

The end closure 19 with a battery B installed in the battery holder frame portion 20 and the bottom end of the spring clip 21 is secured in the bottom end 11K of the hand grip portion 11A by installing two screws 12 in the screw holes 12A on the side of the hand grip portion and threadedly engaging them in the upstanding flanges 19B on each side of the battery holder frame. It should be understood that the end closure 19 and spring clip 21 may be removably secured in the open bottom end 11K of the hand grip portion by various other means.

A low-battery indicator light 22, such as an LED operatively coupled with the battery B through the electrical circuitry of the circuit board 17 extends through an opening on the upper portion 11C of the housing 11, and becomes illuminated to indicate a low-battery condition.

The piezoelectric speaker 16, the circuit board 17, the push-button activation switch 14, the end closure 19 with the battery B mounted thereon, and the low-battery indicator light 22, are securely retained in the housing 11 when the two halves of the housing are secured together by the fastener screws 12. The wiring and electrical circuitry details of the components are conventional and readily understood by those skilled in the art and therefore are not shown or described in detail. The terminals of the battery B are connected with the circuitry of the circuit board 17 by a conventional battery snap connector, and wire leads extend between the battery B, the activation switch 14, the circuit board 17, the microprocessor (microcontroller) 18, and the piezoelectric speaker 16, to supply power controlled by the activation switch, to operate the sound generating system.

The electromechanical horn device 10 may also be provided with an attachment assembly 30 for attaching it to a bicycle, scooter, motorcycle, baby stroller, or other conveyance or object. For purposes of example only, and not limited thereto, the use of the attachment assembly 30 with a bicycle will be described; however, it should be understood that the use of the attachment assembly is not limited to a bicycle. The attachment assembly 30 includes a clamp member 31 which is removably attached to the generally cylindrical upper portion 11J of the hand grip portion 11A and an insert member 32 which extends from the clamp member for connection to a portion of the bicycle part, such as the crossbar, handlebar, down tube or some other area.

The clamp member 31 has a central body portion with a generally rectangular open frame 31A and laterally opposed curved arms 31B that extend at least partially around and snap fit onto the generally cylindrical neck portion 11J of the hand grip portion 11A above the longitudinally spaced depressions 11H, such that the horn device 10 can be easily removed when needed. The generally rectangular open frame 31A has passageways 31C extending through opposed sides thereof. The central body portion of the clamp member 31 has a generally rectangular cavity 31D that extends inwardly from the open frame 31A.

The insert member 32 of the attachment assembly 30 is formed of a resilient material such as, for example, rubber, and has a central generally rectangular base 32A, a smaller generally rectangular tongue 32B extending forwardly therefrom, and curved arms 32C that extend outward from the rectangular base in laterally opposed relation. A passageway 32D extends through the generally rectangular base 32A between opposed lateral sides. When pressed together, the generally rectangular tongue 32B of the insert member 32 is received in the cavity 31D of the clamp member 31, the generally rectangular base 32A of the insert member is frictionally engaged in the open frame 31A of the clamp member, and the passageway 32D of the base is axially aligned with opposed passageways 31C in the open frame 31A of the clamp member 31.

The laterally opposed curved arms 32C of the insert member 32 are configured to extend at least partially around a cylindrical or tubular portion of a bicycle part, such as the crossbar, handlebar, down tube or other area. A flexible strap (not shown) may be inserted through the axially aligned passageways 31C and 32D of the open frame 31A of the clamp member 31 and base 32A of the insert member 32, and secured over the cylindrical or tubular portion of the bicycle part to secure the horn device 10 to the cylindrical or tubular portion of the bicycle part or other conveyance or object. Suitable straps may have a hook and loop fastener system, a buckle at one end, or a perforated portion with a buckle and fastening prong for securing the strap.

The base 32A of the insert member 32 may be attached to the open frame 31A of the clamp member 31 such that the passageway 32D is disposed vertically or horizontally relative to the clamp member 31, such that the vertical axis of the horn device 10 is disposed either parallel with, or perpendicular to, the axis of the cylindrical or tubular portion of the part to which it is attached. For example, if the user wishes to attach the electromechanical horn device 10 to a handlebar, they may want the hand grip portion 11A of the horn device in a position that is perpendicular to the handlebar, or if attaching it to the down tube, the user may want the hand grip portion to be positioned parallel with the down tube. It should be understood that the clamp member 31 and the insert member 32 may be integrally formed as a single unit, or may be connected together such as by a swivel connection.

The sound producing system is activated by a user depressing the thumb button 13 which moves the activation switch 14 to the ON position to supply power to the circuitry and microcontroller 18 which is programmed to produce drive signals causing the piezoelectric speaker 16 to emit a predetermined sound (described hereinafter). The microcontroller 18 may include oscillator/driver circuitry, and voltage booster circuitry for producing boosted sound signals to the piezoelectric speaker 16. The microcontroller 18 has an executable program stored in memory configured to produce signals in a repetitive sequential pattern, each having a frequency, decibel level, and duration determined by the program.

The piezoelectric speaker 16 emits a series of short, audible sound signals in a repetitive pattern, each generated signal having a fundamental frequency with associated harmonics, a decibel level, and duration determined by the program. The microcontroller 18 may be programmed to cause the piezoelectric speaker to emit a series of short, "two-tone" audible sound signals of different fundamental frequencies in a repetitive alternating pattern. Alternatively, the microcontroller 18 may be programmed to cause the piezoelectric speaker 16 to emit a series of short, "one-tone" audible sound signals of the same fundamental frequency in a repetitive pattern.

In the following discussion, the term "generated signal" refers to the sound signal that is generated and emitted by the piezoelectric speaker and has a fundamental frequency, as distinguished from the harmonic component frequency of the fundamental frequency of the generated signal.

As used herein, the term "two-tone" signal pattern refers to a series of generated signals wherein a first generated sound signal having a fundamental frequency with a second harmonic component is followed by a second generated signal having a higher fundamental frequency with a second harmonic. As used herein, the term "one-tone" signal pattern refers to a series of generated signals, each having the same fundamental frequency with a second harmonic component.

Repetitive Two-Tone Signal Pattern

In a first example of a "two-tone" series of signals, a first generated sound signal has a fundamental frequency in a range of from about 3 kHz to about 5 kHz (3,000 Hz to about 5,000 Hz), a decibel level in the range of from about 95 dB to about 115 dB (SPL) at 1 meter, and duration period in the range of from about 50 to 70 milliseconds. The second harmonic component of the fundamental frequency of the first generated sound signal is in the range of from about 6 kHz to about 10 kHz (6,000 Hz to about 10,000 Hz) and has a decibel level in the range of from about 75 dB to about 95 dB (SPL) at 1 meter. The first generated sound signal is followed by a second generated signal having a fundamental frequency in the range of from about 6 kHz to about 10 kHz (6,000 Hz to about 10,000 Hz) and has a decibel level in the range of from about 75 dB to about 95 dB (SPL) at 1 meter. Thus, in this example, the range of the fundamental frequency of the second generated sound signal is in the same range as the second harmonic component of the fundamental frequency of the first generated sound signal.

In a second example of a "two-tone" series of signals, the first generated sound signal may have a fundamental frequency of about 4 kHz, a decibel level of about 95 dB to about 115 dB (SPL) at 1 meter, a duration period of about 65 milliseconds. The second harmonic component of the fundamental frequency of the first generated sound signal is about 8 kHz, and has a decibel level in the range of from about 75 dB to about 95 dB (SPL) at 1 meter. The first generated sound signal is followed by a second generated sound signal having a fundamental frequency of about 4.5 kHz, a decibel level of about 95 dB to about 115 dB (SPL) at 1 meter, a duration period of about 65 milliseconds, and having a second harmonic component of about 9 kHz with a decibel level in the range of from about 75 dB to about 95 dB (SPL) at 1 meter Thus, in this example, the first generated signal and the second generated signal each have a second harmonic component of about 8 kHz and 9 kHz, respectively.

Repetitive One-Tone Signal Pattern

In a first example of a "one-tone" series of signals, each generated sound signal has a fundamental frequency in a range of from about 3 kHz to about 5 kHz (3,000 Hz to about 5,000 Hz), a decibel level in the range of from about 95 dB to about 115 dB (SPL) at 1 meter, and duration period in the range of from about 50 to 70 milliseconds. The second harmonic component of the fundamental frequency of each generated signal is in the range of from about 6 kHz to about 10 kHz (6,000 Hz to about 10,000 Hz) and has a decibel level in the range of from about 75 dB to about 95 dB (SPL) at 1 meter.

In a second example of a "one-tone" series of signals each generated sound signal has a fundamental frequency of about 4 kHz to about 4.5 kHz, a decibel level in the range of from about 95 dB to about 115 dB (SPL) at 1 meter, and a duration period of about 65 milliseconds; and the second harmonic component of the fundamental frequency of each generated signal is in the range of from about 8 kHz to about 9 kHz, and has decibel level in the range of from about 75 dB to about 95 dB (SPL) at 1 meter.

The values discussed above have been found to be particularly effective in dispersing or deterring an aggressive canine, and in the following discussion, the canine species is used for purposes of example only, and not limited thereto. It should be understood that the present device may be used for dispersing or deterring animals of other species.

Figure 7:
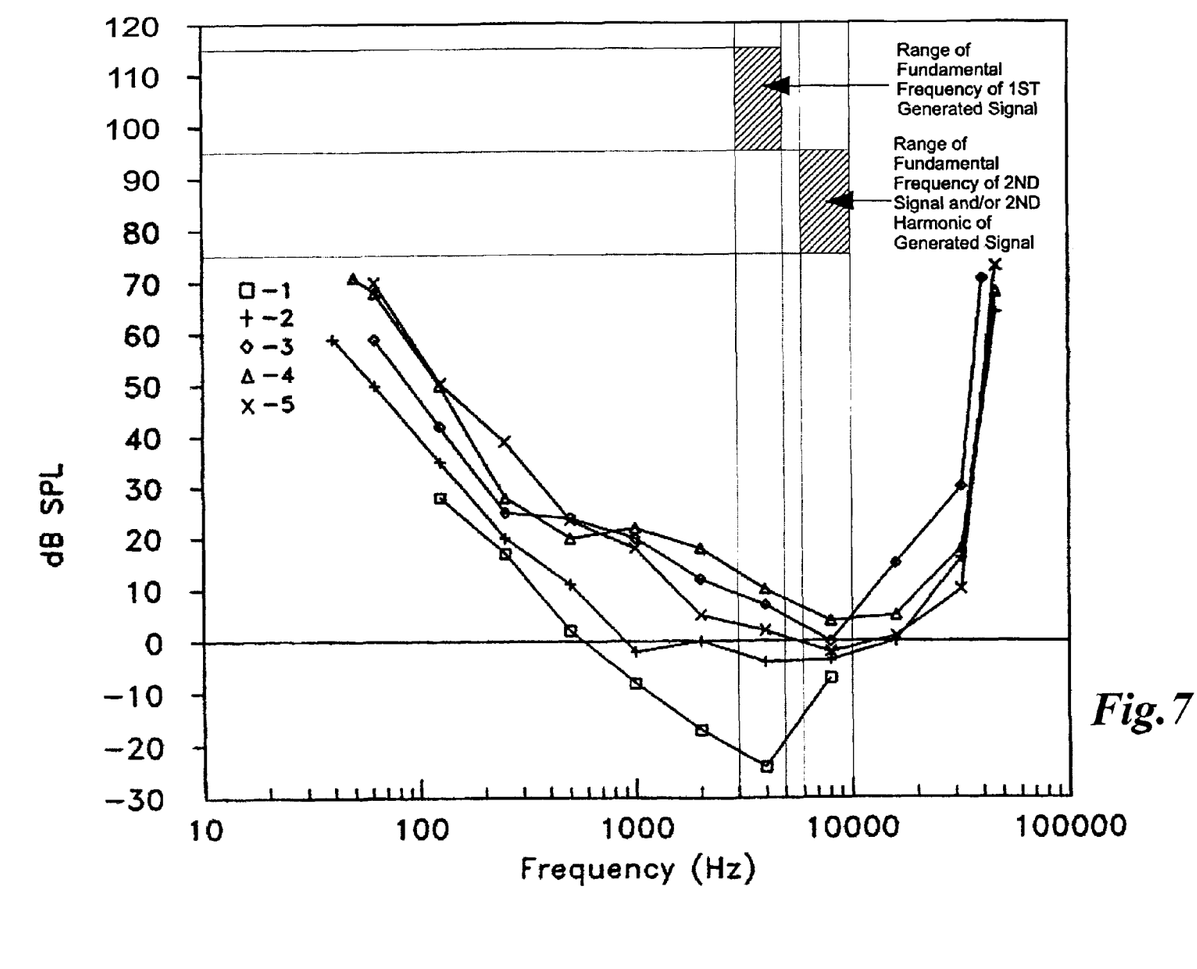
FIG. 7 is an audiogram illustrating the range of hearing sensitivity of several breeds of dogs and the frequency range and decibel level of the first and second output sound signals produced by the present electromechanical horn device in accordance with the present invention.

Referring now to FIG. 7 there is shown an audiogram illustrating the hearing sensitivity of dogs from a book compiling thousands of published references into a single source (RR Fay, 1988, *Hearing in Vertebrates: a Psychophysics Databook*. Hill-Fay Associates, Winnetka Ill.). The audiogram compiles data on the dog from two published sources: one reporting an average from 11 dogs of unspecified breeds (E A Lipman & J R Grassi, 1942, *Comparative auditory sensitivity of man and dog*. Amer J Psychol 55:84-89); and one reporting results from single dogs of four breeds (H E Heffner, 1983, *Hearing in large and small dogs: Absolute thresholds and size of the tympanic membrane*, Behav Neurosci 97:310-318). Frequency is displayed on a logarithmic scale from 10 Hz to 100,000 Hz (100 kHz).

The audiogram of FIG. 7 expands the stimulus intensity range (in dB sound pressure level) of the original RR Fay audiogram to encompass the higher dB range of the present invention. The legend corresponding to the audiogram is presented in Table 1, below.

TABLE 1

| | Legend |
|---|---|
| ☐ - 1 | Curve 1 = average from 11 dogs of unspecified breeds (Lipman & Grassi, 1942) |
| + - 2 | Curve 2 = Poodle (Heffner, 1983) |
| ◇ - 3 | Curve 3 = Dachshund (Heffner, 1983) |
| △ - 4 | Curve 4 = Saint Bernard (Heffner, 1983) |
| X - 5 | Curve 5 = Chihuahua (Heffner, 1983) |

George M. Strain, Professor of Neuroscience at the Comparative Biomedical Sciences School of Veterinary Medicine of Louisiana State University in Baton Rouge, La. published a paper titled *How Well Do Dogs and Other Animals Hear*? discussing the RR Fay, 1988, audiogram and reported that it can be seen that the lowest intensity detected differs between the two studies; and the professor placed greater reliance on the Heffner study because it is more current, and because Heffner is a widely published and respected audiology researcher. It can be seen in the audiogram of FIG. 7 that the greatest sensitivity (i.e. the frequencies that can be detected at the lowest intensities) is in the frequency range of 4 kHz to 10 kHz (4,000 Hz to 10,000 Hz).

The range of signal values of the first examples of the "two-tone" and "one-tone" signal patterns discussed above are shown on the audiogram of FIG. 7 as shaded rectangles. It can be seen that the generated signals emitted by the present electromechanical horn device have a fundamental frequency in a range from about 3 kHz to about 5 kHz (3,000 Hz to about 5,000 Hz), a decibel level in the range of from about 95 dB to about 115 dB (SPL) at 1 meter. The second harmonic component of the fundamental frequency of the generated signals is in the range of from about 6 kHz to about 10 kHz (6,000 Hz to about 10,000 Hz) and has a decibel level in the range of from about 75 dB to about 95 dB (SPL) at 1 meter.

In the "two-tone" pattern, the first generated sound signal is followed by a second generated signal having a fundamental frequency in the range of from about 6 kHz to about 10 kHz (6,000 Hz to about 10,000 Hz) and a decibel level in the range of from about 75 dB to about 95 dB (SPL) at 1 meter.

In the second examples of the "two-tone" and "one-tone" series of signals, the first generated sound signal has a fundamental frequency of about 4 kHz, a decibel level of from about 95 dB to about 115 dB (SPL) at 1 meter, a duration period of about 65 milliseconds and a second harmonic component of the fundamental frequency of about 8 kHz, with decibel level in the range of from about 75 dB to about 95 dB (SPL) at 1 meter. The first generated sound signal is followed by a second generated sound signal having a fundamental frequency of about 4.5 kHz, a decibel level of about 95 dB to about 115 dB (SPL) at 1 meter, a duration period of about 65 milliseconds, and having a second harmonic component of about 9 kHz with a decibel level in the range of from about 75 dB to about 95 dB (SPL) at 1 meter. Thus, in the second examples, the first and second generated signals fall within the frequency range depicted in the upper shaded rectangle of FIG. 7, and the first generated signal and the second generated signal have a second harmonic component of about 8 kHz and 9 kHz, respectively, that fall within the range depicted in the lower shaded rectangle.

Thus, it should be understood from the foregoing, that the present electromechanical horn device produces audible sound signals at fundamental frequencies and associated second harmonic component frequencies in decibel levels in the most sensitive frequency range of a dog's hearing that can be detected at the lowest intensities at which dogs of a variety of breeds and ages will respond (4 kHz to 10 kHz), thereby providing a very effective device to disperse or deter an aggressive canine in a non-detrimental manner.

Although the high intensity sound produced by the horn is audible to humans; the horn may be positioned or aimed and actuated at a height proximate the dog to focus the sound toward the dog so that the brunt of the sound is experienced by the dog.

It should also be understood from the foregoing that configuration of the present horn device, its clip member allows it to be hand-held, easily transported, stored, or attached to a user's belt, pocket, or garment and easily and quickly removed when needed, and its attachment assembly allows it to be removably attached to a bicycle, scooter, motorcycle, baby stroller, or other conveyance or object and easily removed or actuated when needed.

The following are several examples of methods of deterring an aggressive canine when encountered utilizing the present horn device. It can be carried and held by the hand grip when walking or jogging, and quickly actuated by depressing the thumb button to direct the sound toward the canine. If it is attached in an inverted position to a person by means of the spring clip, when the person is walking, jogging, or riding a bicycle, it can be easily and quickly be actuated while in the attached condition by depressing the thumb button, or it can be easily and quickly be removed and held by the hand grip and actuated to direct the sound toward the canine.

If it is attached to a bicycle, scooter, motorcycle, baby stroller, or other conveyance, by means of the attachment assembly, it can be easily and quickly be actuated while attached by depressing the thumb button, or it can be easily and quickly be detached from the bicycle, scooter, motorcycle, baby stroller, or other conveyance, by separating the attachment assembly and held by the hand grip and actuated to direct the sound toward the canine.

Although, an aggressive canine, has been used for purposes of example in the discussions above, it should be understood that the present device may be used for dispersing or deterring animals of other species.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A portable manually operated electromechanical horn device for dispersing or deterring aggressive animals, comprising:
    a housing having an inverted generally L-shaped configuration with a generally vertical hand grip portion to be grasped by the palm of a hand of a user, longitudinally spaced depressions formed along a front surface for receiving the fingers of a user, and an outwardly flared portion extending generally perpendicular from said hand grip portion terminating in a generally cylindrical distal end portion;
    a sound generating system in said housing including a piezoelectric speaker mounted in said generally cylindrical distal end portion, and a microcontroller operatively connected therewith programmed to cause said piezoelectric speaker to generate a series of short, audible sound signals having two different fundamental frequencies in a repetitive alternating signal pattern;
    a battery mounted in said housing connected with said piezoelectric speaker and said microcontroller for supplying power thereto;
    a low-battery indicator light on said housing operatively connected with said battery to become illuminated to indicate a low-battery condition; and
    a push button on said housing coupled with an on-off switch mounted within said housing and operatively connected between said electrical power source and said sound generating system to power said piezoelectric speaker and said microcontroller, said push button mounted at a position to be depressed by a thumb of the user while grasping said handle;
    where, in use, activation of said push button causes said piezoelectric speaker to emit said series of short audible sound signals having two different fundamental frequencies in said repetitive alternating signal pattern, comprising:

a first generated sound signal having a decibel level in a range of from about 95 dB to 115 dB, a duration period of about 65 milliseconds, and a fundamental frequency of about 4 kHz with an associated second harmonic component frequency of about 8 kHz, followed by;

a second generated sound signal having a lower decibel level in a range of from about 75 dB to 95 dB, a duration period of about 65 milliseconds, and a higher fundamental frequency of about 4.5 kHz, with an associated second harmonic component frequency of about 9 kHz; and wherein said decibel levels and fundamental frequencies of said first and second generated sound signals and their respective said associated second harmonic frequencies in said repetitive alternating signal pattern are all within a frequency range of from about 4 kHz to 9 kHz to effectively deter, scare, or repel an aggressive animal in a non-detrimental manner.

2. The portable manually operated electromechanical horn device according to claim 1, further comprising:

a spring clip removably mounted on said housing having a resilient clip arm extending a distance along one outer lateral side of said hand grip portion for releasably attaching said horn device to a user's belt, pocket, or garment, said clip arm having a lower portion that bows outwardly and upwardly at a lower end and then curves inwardly and terminates in a short outwardly curved portion at an upper end.

3. The portable manually operated electromechanical horn device according to claim 1, further comprising:

an attachment assembly having a clamp member with a pair of laterally opposed curved arms that extend at least partially around and snap fit onto said housing above said hand grip portion, and a pair of resilient laterally opposed curved arms configured to releasably engage a cylindrical or tubular portion of an object or conveyance for transporting said horn device thereon.

* * * * *